United States Patent [19]
Ohlemacher et al.

[11] Patent Number: 5,953,702
[45] Date of Patent: *Sep. 14, 1999

[54] COMPUTERIZED COMPREHENSIVE DOCUMENT AUDIT

[75] Inventors: David M. Ohlemacher, Dayton; Timothy T. Apke, Mason, both of Ohio

[73] Assignee: The Standard Register Company, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/622,000
[22] Filed: Mar. 25, 1996
[51] Int. Cl.⁶ .................................................. G06F 17/60
[52] U.S. Cl. .................................. 705/1; 705/45; 395/234
[58] Field of Search ........................... 364/468; 395/234; 705/9, 1, 45

[56] References Cited

U.S. PATENT DOCUMENTS

| | | | |
|---|---|---|---|
| 5,463,555 | 10/1995 | Ward et al. | 364/468 |
| 5,557,515 | 9/1996 | Abbruzzese et al. | 364/401 |
| 5,581,749 | 12/1996 | Hossain | 705/1 |
| 5,696,906 | 12/1997 | Peters et al. | 395/234 |
| 5,812,989 | 9/1998 | Witt | 705/45 |

Primary Examiner—Kevin J. Teska
Assistant Examiner—Thuan Do
Attorney, Agent, or Firm—Killworth, Gottman, Hagan, Schaeff LLP

[57] ABSTRACT

A comprehensive document audit system and a process for generating document field reports utilizing a computer programmed to sort document data indicative of the characteristics of a group of selected documents are provided. A digital controller is programmed to cause document data indicative of the characteristics of a selected document to be received and sorted and is programmed to cause sorted document data to be saved. A document data entry device and a document field report generator are in communication with the digital controller. A system operator collects a group of documents and assigns document characteristic information to the documents. The operator identifies a set of document data indicative of the characteristics of each document and inputs the document data into a computer programmed to cause the document data to be sorted and saved. The computer sorts the document data and a field report is generated from the sorted document data.

39 Claims, 15 Drawing Sheets

COMPREHENSIVE DOCUMENT AUDIT - XYZ COMPANY

FAST FORMPAC - XYZ COMPANY

GENERAL INFORMATION
- FORM NUMBER: 123
- ORDER NUMBER: 123
- MTHLY USAGE: 1.000
- FORM NAME: TIM
- FREIGHT TERM:
- SELL PRICE: 10.00

WAREHOUSE INFORMATION
- WAREHOUSE:
- BILLING U/M:
- BILLING U/M QTY:
- UNITS STORED:
- QTY PER PACK:
- UNIT OF ISSUES:
- QTY/UNIT OF ISSUE:
- QTY STORED:
- PACKS PER CARTON:
- REORDER POINT:

FORM MANAGEMENT GROUPING
- PRICE LIST: 000
- PLYS: 1
- FORM WIDTH: 08 / 01 / 02
- FORM LENGTH: 11 / 00 / 00

Buttons: SAVE, CLOSE, SEARCH, DELETE, ADD NEW, CANCEL, PREVS, NEXT, EXIT

| | | | | | | | |
|---|---|---|---|---|---|---|---|
| IS THIS FORM CURRENTLY IN USE? | | ☐ YES | | ☐ NO | FORM NUMBER: | | |
| FUNCTION/PURPOSE OF FORM (IE.-RECORD VITAL SIGNS, OBTAIN CONSENT, ETC.) | | | | | | | |

| | |
|---|---|
| DEPARTMENT: | REVISION DATE: / / |

| | | | | | | | |
|---|---|---|---|---|---|---|---|
| DOES FORM HAVE CURRENT LOGO? | ☐ YES | ☐ NO | IS FORM PHOTOCOPIED? | ☐ YES | ☐ NO | CONSEC. NO.? | ☐ YES ☐ NO |

| | | |
|---|---|---|
| NO. OF FORMS USED PER PLEASE MARK ONE: ☐ SHIFT ☐ DAY ☐ WEEK ☐ MONTH ☐ YEAR | ▽ PLACE NUMBER HERE | UNIT OF ISSUE (PLEASE MARK ONE) ☐ BOX ☐ PAD ☐ EACH ☐ REAM ☐ CASE ☐ PKG ☐ LOT |
| NO. OF FORMS IN UNIT ISSUED? | IS FORM (PLEASE MARK ONE) ☐ HANDWRITTEN ☐ IMPACT PRINTER ☐ LASER PRINTER | ☐ OTHER _____ |

HOW LONG DOES IT TAKE TO COMPLETE THIS FORM?

WHAT HAPPENS TO FORM AFTER IT IS FILLED OUT? (IE.-FILLED, SENT, DESTROYED, ETC.)

COMMENTS

IMPROVEMENT SUGGESTIONS

| TO BE FILLED IN BY STANDARD REGISTER REPRESENTATIVE | | | |
|---|---|---|---|
| FORM WIDTH: | FORM LENGTH: | FORM TYPE: | ☐ SINGLE SHEET ☐ MULTIPLE PARTS |
| ☐ CARBON | ☐ CARBONLESS | ☐ BACKPRINTING | ☐ PERFORATIONS |
| ☐ FILL HOLES PLEASE MARK LOCATION: ☐ TOP ☐ BOTTOM ☐ LEFT ☐ RIGHT | | | |
| NO. OF INK COLORS: | NO. OF PAPER COLORS: | PAPER WEIGHTS: | |

FIG. 16

COMPUTERIZED COMPREHENSIVE DOCUMENT AUDIT

BACKGROUND OF THE INVENTION

The present invention relates to the production, design, and maintenance of business forms within a document management system. In order to produce, design, and maintain a group of forms for a particular business, it is often desirable to evaluate the forms currently in use at the business. The object of the evaluation process is to produce a new form portfolio for the business, tailored to the specific needs of the business. The new form portfolio is likely to represent, for example, a streamlined form inventory, a more comprehensive form inventory, a more cost-effective form inventory, or combinations thereof.

The conventional method of evaluating these forms involves the collection of samples of each form. The sample forms are usually gathered from a central warehouse and grouped together in, for example, a three ring binder. The entire collection of the particular business' forms are then evaluated as a group by manually paging through the binder. Evaluation notes are manually recorded from page to page until the entire binder has been examined. The evaluation notes are then used as the basis for producing a new group of business forms which more appropriately corresponds to the particular needs of the business.

According to the conventional method of evaluation, it is difficult to examine and review the form characteristics of the group of forms because it is not possible to view information from more than one form simultaneously. For example, if an analysis technician wishes to evaluate and compare the names of all the forms, it is necessary to flip from form to form within the binder and observe the name on each form. Similarly, if the analysis technician wishes to examine the collective functions of the forms, it is necessary to page through the binder and individually ascertain the function of each form. This page-by-page analysis approach is inefficient, as a result of its manual nature, and is inaccurate because it is easy to inadvertently skip forms and overlook form information while paging through the binder. This inaccuracy and inefficiency becomes exaggerated as the number of forms within the binder and the number of binders holding the forms increase.

The conventional method of evaluation is also undesirable because every time an analysis technician wishes to evaluate a previously unexamined aspect of the forms, it is necessary to return to the group of forms in the binder and resume the page-by-page approach described above. Similarly, if a new form is added to the group of forms, in order to compare the new form to the existing forms, it is also necessary to return to the page-by-page approach. Thus, the conventional method does not provide an easily updatable catalog of form information.

It is often preferable to prepare a standardized document management system data sheet for each form within the group of forms stored in the binder. The information on standardized data sheet is utilized to create new forms using a computerized document management system. According to the conventional method of evaluation, these data sheets must be prepared independent of the preparation of the evaluation notes. Further, if any portion of information present on one of the forms changes, a new standardized document management system data sheet must be manually prepared. Thus, according to the conventional evaluation method, even where a computerized document management system is used to produce new forms, a substantial investment of time is required to prepare the standardized data sheets.

Accordingly, there is a need for a comprehensive document audit system and a process for generating a document field report which provide for convenient examination and review of form information, eliminate the need for manual page-by-page form analysis, have the capacity to efficiently handle a large number of forms, provide an easily updatable catalog of form information, and can quickly and easily generate standardized document management system data sheets.

SUMMARY OF THE INVENTION

The present invention provides a comprehensive document audit system and a process for generating document field reports utilizing a computer programmed to sort document data indicative of the characteristics of a group of selected documents.

In accordance with one embodiment of the present invention, a comprehensive document audit system is provided comprising: a digital controller programmed to cause document data indicative of the characteristics of a selected document to be received and sorted, and programmed to cause sorted document data to be saved; a document data entry device in communication with the digital controller; and, a document field report generator in communication with the digital controller.

The comprehensive document audit system may further comprise a sorted data memory in communication with the digital controller. The data entry device may comprise a computer terminal. The report generator may comprise a printer, a computer display screen, or a data output port coupled to a document management system.

The digital controller preferably sorts data input from the data entry device according to preselected data fields. The report generator preferably includes a report content selector coupled to the digital processor, and the digital processor is preferably programmed to cause generation of a report displaying sorted data corresponding to at least one, or a plurality, of the preselected data fields. Alternatively, the digital processor is programmed to cause generation of a report displaying sorted data corresponding to a plurality of the preselected data fields and to sort each report by any field contained on that report. Similarly, the digital processor may be programmed to cause the report generator to generate a custom field-selected report.

The document data may include document identification information, document physical characteristic information, document storage information, document distribution information, document usage information, a form function code, and/or at least one form improvement code. The at least one improvement code preferably includes a value added rating code, a time savings code, and/or a textual improvement code. The document data may further include information pertinent to future data input into a document management system.

The digital controller may be further programmed to cause sorted document data to be imported from or exported to a companion comprehensive document audit system, to cause sorted document data to be imported from or exported to a data file, and/or to cause sorted document data to be exported to a document management system.

In accordance with another embodiment the present invention, a process for generating a document field report is provided comprising: collecting a group of documents; assigning document characteristic information to at least one document within the group of documents; identifying a set of document data indicative of the characteristics of each document within the group of documents; inputting the document data into a computer programmed to cause the document data to be sorted and to cause sorted document data to be saved; sorting the document data with the computer; and, generating a field report from the sorted document data.

The assigning step preferably includes the step of assigning a department code, a function code, at least one improvement code, a value added rating, and/or a time savings code to each document within the group of documents.

The identifying step preferably includes recording the document data in a predetermined format. The inputting step may comprise entering the document data at a computer terminal. The sorting step preferably comprises identifying a document from which the characteristic document data originated and separating the characteristic document data for each document into a plurality of data fields. A display screen user interface format is preferably used to accomplish the identifying and separating steps.

The generating step may comprise generating the field report as a display on a computer display screen, generating the field report as a computer print-out, or generating the field report as a data input to a document management system. The field report may indicate duplicate documents.

Accordingly, it is an object of the present invention to provide a computerized comprehensive document audit system and an automated process for generating document field reports which provide a convenient, efficient, and updatable means for evaluating a form inventory and which can quickly and easily generate standardized document management system data sheets. These and other features and advantages of the present invention will be apparent from the following description, the accompanying drawings, and the appended claims.

BRIEF DESCRIPTION OF THE DRAWINGS

FIGS. 4–15 are screen prints of a display screen user interface according to a preferred embodiment of the present invention; and FIG. 16 is an illustration of a data collection form according to a preferred embodiment of the present invention.

DETAILED DESCRIPTION OF THE INVENTION

Figure 1:
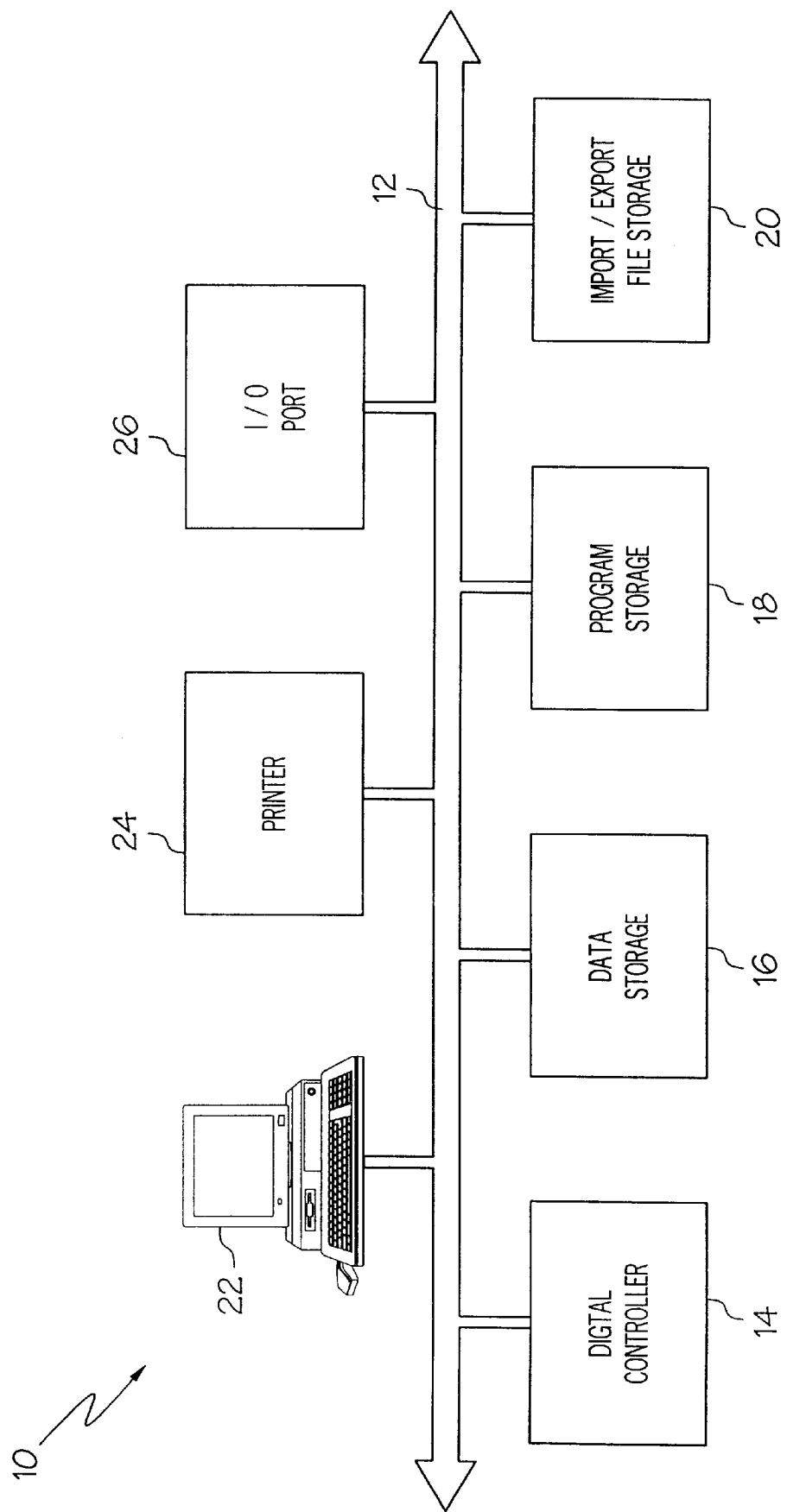
FIG. 1 is a block diagram of the components of a comprehensive document audit system in accordance with the present invention.

FIG. 1 illustrates the electronic components of a comprehensive document audit system (CDA) 10. The overall operation of the CDA 10 is controlled by a digital controller 14, most commonly a digital central processing unit (CPU). The digital controller 14, includes data, address, and control buses, represented generally by the bus 12. A computer terminal 22, a printer 24, an input/output port (I/O port) 26, and an import/export file storage device 20 are connected to the digital controller 14 and are controlled thereby according to the operating program resident in a digital program storage device 18. The import/export file storage device 20 is typically a peripheral storage device wherein data is saved on magnetizable floppy disks but could be any file storage device which saves and enables transfer of data files. The program storage device 18 is connected to the digital controller 14 via the bus 12. The CDA 10 also includes data storage device 16 connected to the digital controller 14 by the bus 12 for providing storage of data processed by the digital controller 14. It is contemplated by the present invention that the program storage device 18 and the data storage device 16 may comprise a single digital memory in communication with the digital controller 14. It is further contemplated by the present invention that the data storage device 16 may comprise a network server in communication with the digital controller 14, and in communication with digital controllers of other CDA systems (not shown). In this manner, a plurality of CDA systems can be provided in communication with a common database.

The terminal 22 typically comprises a computer keyboard, a computer display screen, and a device for moving a cursor or other object around on the display screen. The terminal 22 may alternatively comprise any state of the art data entry device with which an operator can produce data to be processed by the CDA operating program, e.g., a computer display screen user interface similar to the one represented by the screen prints shown in FIGS. 4–15, a voice activated data entry device, etc.

In the preferred manner of operating the CDA, a CDA operator, or system operator, which may be an individual operator or a group of operators working in collaboration, collects a group of documents, assigns document characteristic information to documents within the group, and identifies characteristic document data for each document. FIG. 16 is an illustration of a data collection form which is preferably used by a system operator to identify and assign appropriate characteristic document data. As is clearly illustrated in FIG. 16, document characteristic information assigned to the document includes data that represents the physical construction of the document. For example, the physical construction data includes data indicative of (i) the length and width of the document at issue, (ii) the number of plies included in the document of issue, (iii) the presence or absence of a carbon ply in the document at issue, (iv) the presence and respective positions of backprinting, perforations, or file holes in the document at issue, (v) the number of ink colors or paper colors utilized in the document at issue, (vi) the weight of the paper utilized in the document at issue, etc.

Preferably, the assigned document characteristic information is any type of document information which is not already present on a selected document, and preferably includes, for example, a document name, a department code, a function code, an improvement code, a value added rating, and a time savings code.

If a document name, or form name, is present on the form, that name is preferably used as the document name used for data input. If no name is associated with the document, the CDA operator assigns an appropriate form name. Similarly, all documents collected without a form number have a form number assigned thereto. Preferably, form numbers are taken consecutively from a predetermined block of form numbers and hand written on each un-numbered document. A department code and a function code, derived from document use criteria, are also assigned to each form.

An improvement code is also preferably assigned to each document. The improvement code is based on document features or composition to be added, removed, or altered to give the document more value and/or functionality. Possible improvement codes include, "add file holes," "change construction," "and" "combine with other form." Table 2 illustrates other preferred improvement codes. The system operator subsequently generates a value added rating and a time-savings code based upon an analysis of the improvement codes associated with a document. The value added rating is preferably a numerical improvement ranking based upon the value and/or functionality which would be added to a document by incorporating the suggested improvement. For example, the time savings code represents the reduction in the amount of time necessary to complete or fill out a document in the event the suggested improvements are incorporated into the document and is measured in hours, minutes, and/or seconds. Table 1 is an illustrative example of a value analysis report in columnar format. The report includes the assigned value ranking, time savings, form number, form name, and document department codes.

TABLE 1

| Value Ranking | Savings (hrs) | Form Number | Form Name | Department |
|---|---|---|---|---|
| 3 | 20 | A0-2 | Debit/Shipping Memo | Shipping |
| 2 | 10 | A0-2 | Debit/Shipping Memo | Shipping |
| 2 | 10 | MF-1 | Return Goods Notice | Matrls Mgt |
| 2 | 10 | HR-0 | Personnel Change Sheet | Human Rscs |
| 2 | 10 | GN-0 | Generic Letterhead | |
| 2 | 10 | AB-0 | Purchase Order | |
| 1 | 5 | A0-2 | Debit/Shipping Memo | Shipping |
| 1 | 5 | MF-1 | Retrun Goods Notice | Matrls Mgt |
| 1 | 5 | GN-0 | Generic Letterhead | |

The characteristic document data includes the assigned data and information corresponding to:

(1) document identification information, including a form number, an order number, a form name, a form confidentiality indicator, a form numbering identifier, descriptive remarks, a special handling indicator code, an original vendor identifier, a form type identifier, e.g., "cut sheet," "continuous," a form department identifier, form comments, a form features description, a form completion time indicator, a form source identifier, a primary and secondary form writing device identifier, a form revision date, a form author, a form price list, and/or a form file name;

(2) document physical characteristics information, including a form ply identifier, a form width and length identifier, a paper weight and/or color identifier, and/or an ink color identifier;

(3) document storage information, including a warehouse identification, a units stored code, a quantity per pack identifier, a unit of issue description, a quantity per unit of issue description, a quantity stored identifier, a packs per carton identifier, an indication of number of months on hand at which reorder notices should be generated or a months lead code, and/or a form reorder point designation;

(4) document distribution information, including a freight billing terms indicator, a freight sell price indicator, a billing unit of measure indicator, a billing unit of measure quantity indicator, a product warehouse code or MWP override code, a maximum release quantity indicator, a primary/secondary sort designation, a warehouse release first designation, a global product designation, a cost center identifier, a requisition number, an order is designation, e.g, "complete buy-out," "partial buy-out," "manage only," and/or a purchase order number;

(5) document usage information, including a monthly form usage indicator, an annual usage indicator, an annual cost indicator, a quantity on hand indicator, and/or an order quantity indicator;

(6) form function information or a form function code; and (7) form improvement information, including a textual form improvement code, a form improvement code character, a time savings code, and/or a value added rating.

The CDA 10 prompts the system operator, via terminal 22, to enter characteristic document data, including the assigned data, at terminal 22. Characteristic document data may also be entered at I/O port 26 or retrieved from import/export file storage 20. The data entry format established by the CDA 10 allows the digital controller 14 to identify the document from which the characteristic document data originated and separate the characteristic document data for each document into a plurality of data fields. A display screen user interface is a preferred data entry format. Examples of display screen user interface formats are illustrated in FIGS. 7, 9, and 10, described below.

The data fields corresponding to the characteristic data for each document may vary from document to document; however, all documents will include characteristic data corresponding to at least one common data field and may include characteristic data corresponding to a plurality of common data fields. For example, each document will include a form name corresponding to a form name data field while every document may not include a revision date corresponding to a revision date data field.

Figure 9:
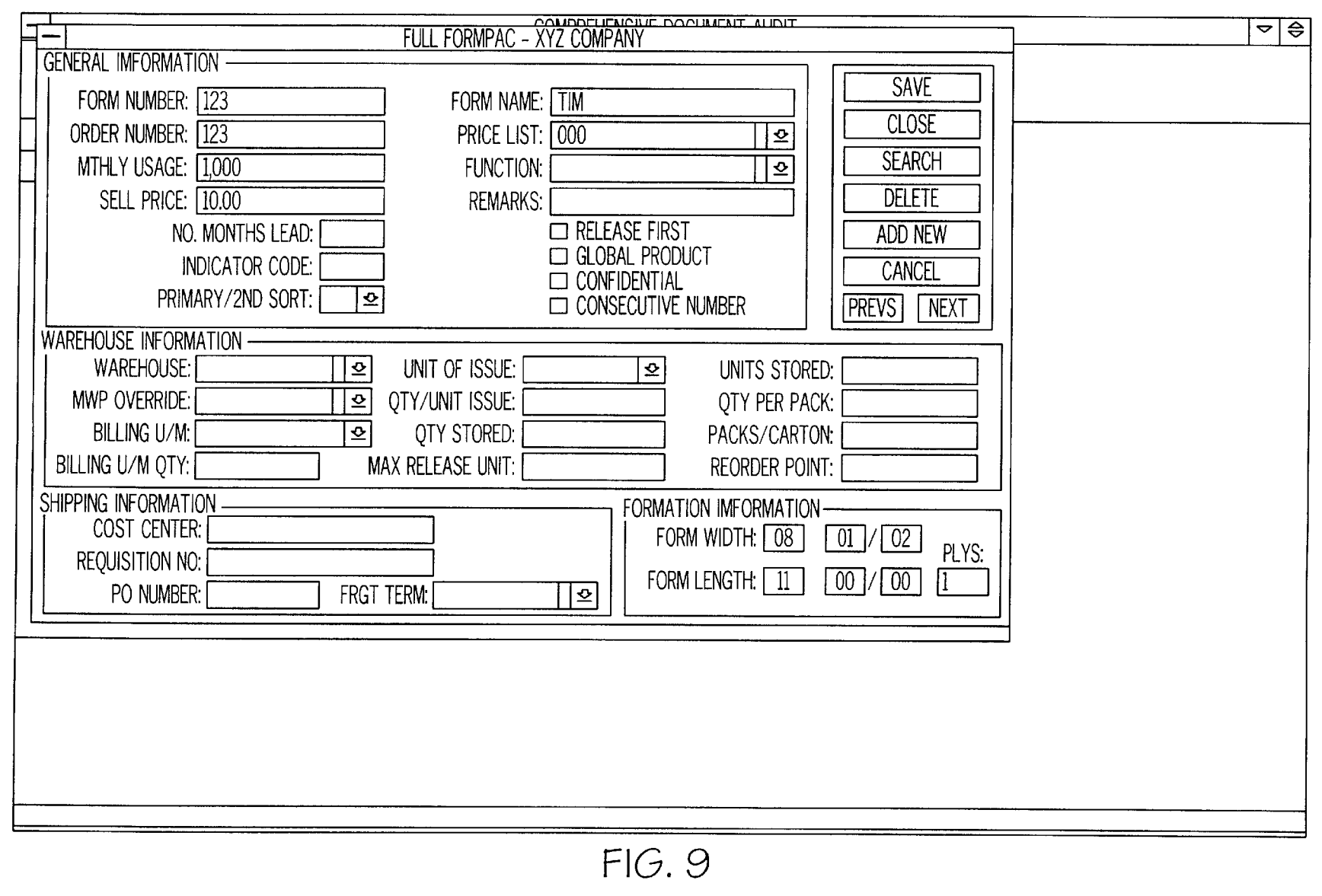
Figure 10:
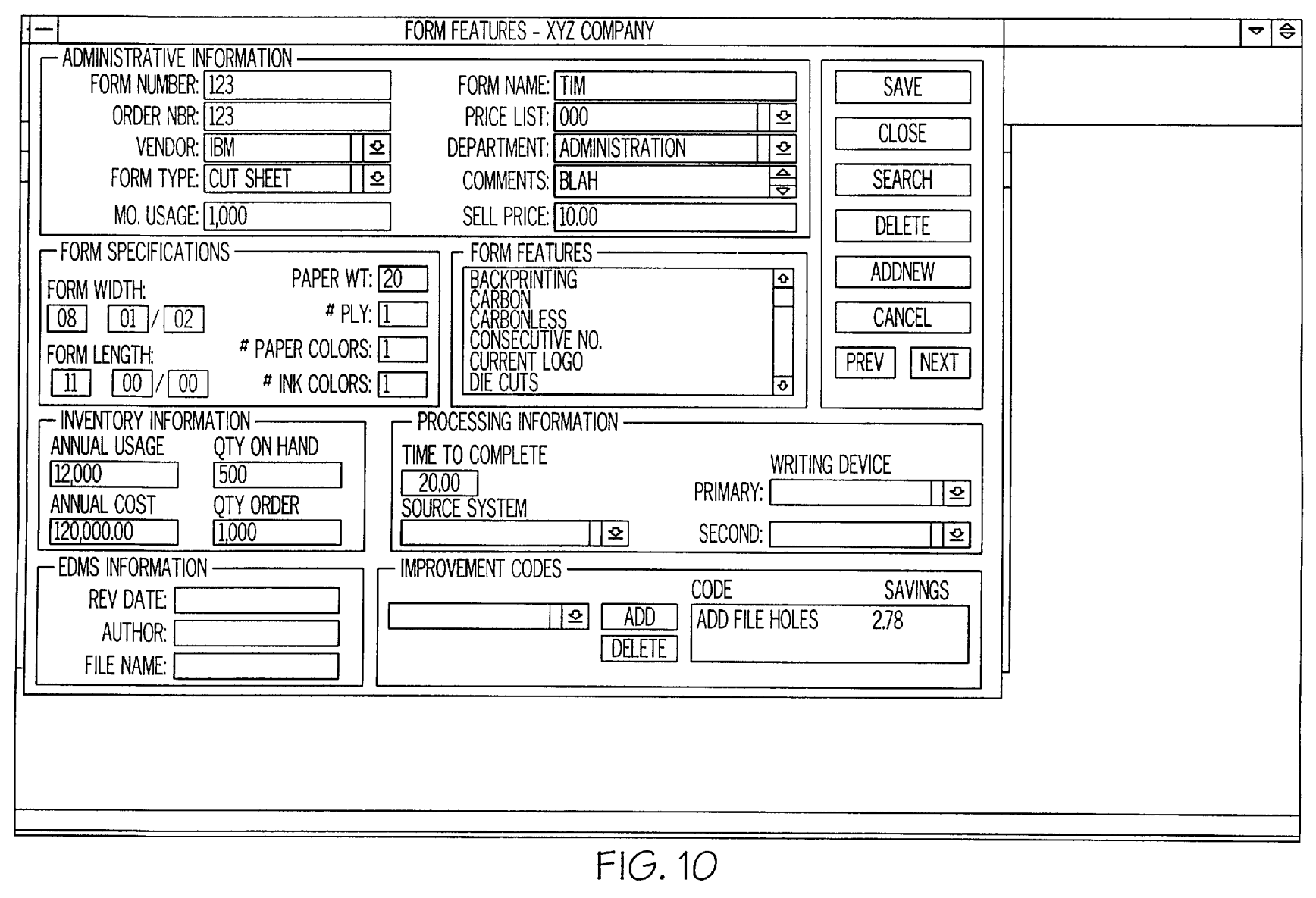

FIGS. 7, 9 and 10 are screen prints illustrating three preferred data field input formats for handling this document characteristic information. The Fast FormPac folder, shown in FIG. 7, enables a user to capture only the most essential database form information. The Full FormPac folder, shown in FIG. 9, enables a user to capture all of the information needed to establish a complete database. The Full FormPac folder can be used by itself, it can be used to expand the information captured using the Fast FormPac folder, or it can be used in conjunction with the Form Features folder. The Form Features folder, shown in FIG. 10, enables a user to capture all of the information needed to fully analyze a company's forms and propose improvements.

The digital controller 14 is programmed to cause document data entered at terminal 22 to be carried along the bus 12 and sorted according to the preselected data fields. The characteristic data for each document sorted into preselected data fields in this manner is saved in the data storage device 16 according to the preselected data fields.

Figure 13:
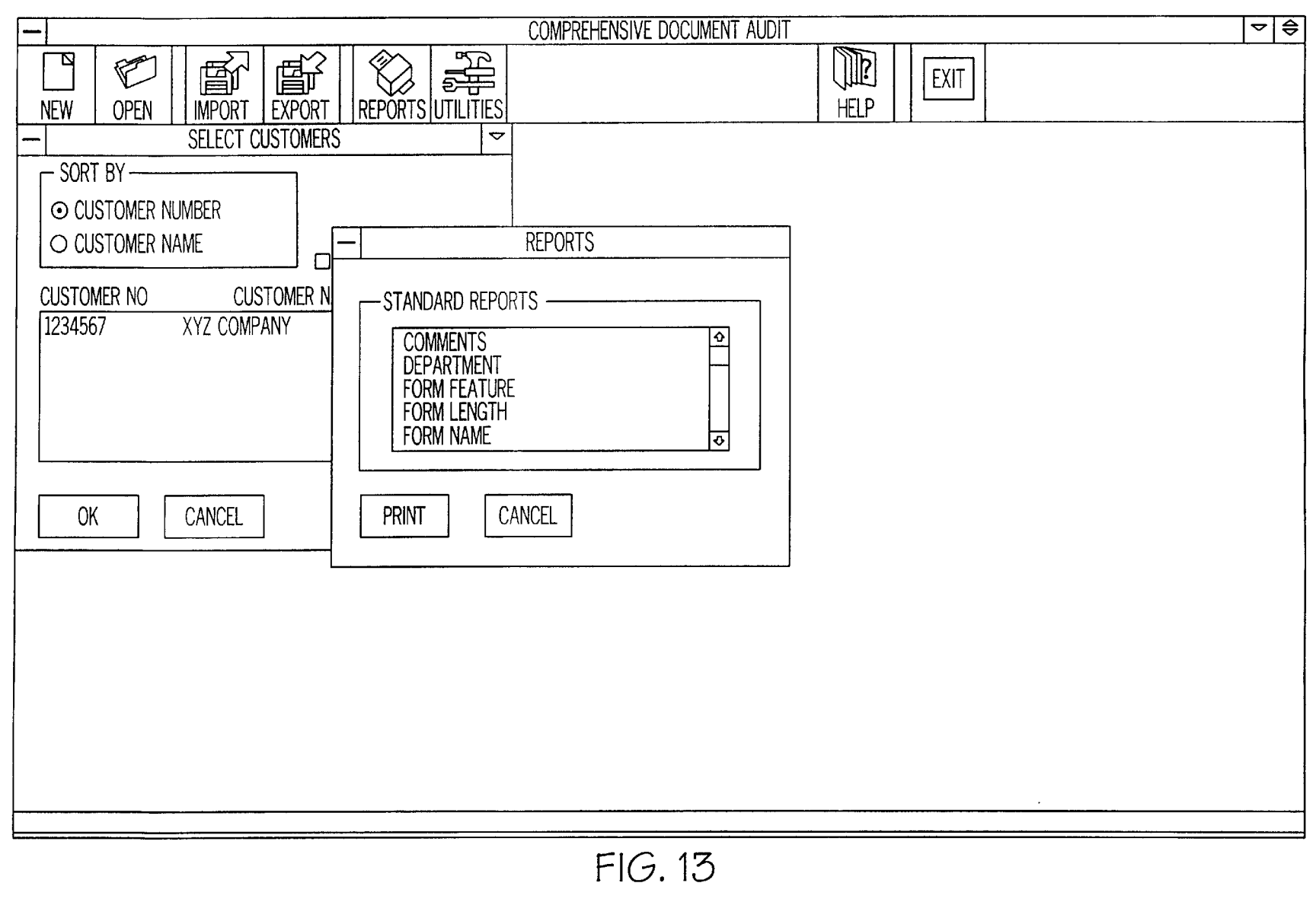

A document field report is generated by selecting a group of report data fields from the preselected data fields identified in the data storage device 16. This selection is accomplished through the use of a keyboard, mouse, and/or a computer display user interface included at the terminal 22. The selected report data fields and the documents having characteristic data corresponding to the selected report data fields determine the report content. Each selected report data field and the characteristic data of each document corresponding to each selected report data field is represented on the document field report. It is contemplated by the present invention that a field report may comprise a single report data field or a plurality of data fields. Standard field reports, having preselected report data fields are preferably established within the operating program of the CDA 10, as indicated in FIG. 13. Additionally, custom field reports having report data fields as selected by the system operator may be established within the operating program of the CDA 10. Duplicate documents are indicated by the form name, form function, and form number field reports.

It is preferable to arrange the field report in columnar format wherein each column corresponds to a report data field and each row corresponds to characteristic document data. Further, for each report, a primary data field is selected and sorted so as to determine the order of the rows on the field report. According to one aspect of the present invention, sorted data corresponding to the selected data fields is sent to the printer 24 to provide the CDA operator with a document field report. Alternatively the document field report may be generated at a computer display screen. Table 2 is an illustrative example of an improvement code report in columnar format:

Improvement Code, the improvement codes for each document are sorted in alphabetical order and the characteristic document data for each document are listed in the same row as that document's Improvement Code under the appropriate report data field heading. Any of the report data fields shown in Table 2 may be designated the primary data field. The arrangement of the rows in a field report depends upon the designated primary data field. It is contemplated by the present invention that a default primary data field framework may be established in the operations program of the CDA.

According to another aspect of the present invention, sorted data corresponding to the selected data fields includes information pertinent to future data input into a document

TABLE 2

| Improvement Code | Form Number | Form Name | Department | Form Type |
| --- | --- | --- | --- | --- |
| Change Construction |  | Debit/Shipping Memo | Shipping | Zip Set |
| Change Construction | A0-2 | Personnel Change | Human Rsrcs. | Zip Set |
| Change Construction | HR-0 | Return Goods Notice | Materials Mgt. | Cut Sheet |
| Change Ink Color | MF-1 | Generic Letterhead |  | Cut Sheet |
| Change Ink Color | GN-0 | Return Goods Notice | Materials Mgt. | Cut Sheet |
| Change Paper | MF-1 | Debit/Shipping Memo | Shipping | Zip Set |
| Imprint Candidate | A0-2 | Generic Letterhead |  | Cut Sheet |
| On Demand | GN-0 | Purchase Order |  | Continuous |
| Candidate | AB-0 | Debit/Shipping Memo | Shipping | Zip Set |
| Redesign | A0-2 |  |  |  |

Table 2 shows the following report data fields: Improvement Code, Form Number, Form Name, Department, and Form Type. Because the primary data field in Table 2 is the management system (DMS). Table 3 shows a preferred DMS input field report in a convenient DMS user recognizable format:

TABLE 3

Order is: C    Order Number: 5130000    Warehouse Code: AAA    Prod ID: A02930
Qty Stored: 2,000    Ref: Y    Prod Descr: DEBIT/SHIPPING MEMO    Units Stored:    Sens: N
Req No:    Qty/Pak:    PC No: 1150000    Pak/Ctn:
Ship U/I Qty: 2,000    Ship U/I: CT    Sell Price: $326.46    Bill U/I Qty: 1000    Billing U/M: M    Frgt/Terms: PD
Function: Shipping    Global: N    Max Rel: 100    Remarks:    Ind Code: IN
Pri/2nd Sort: S    Price List: 430    Ply: 5    Consec: Y    MWP:    Size: 080102 × 110508
Cost Center:    Reorder Point:    Month Lead: 3    Est Month Usage: 500
Order is: C    Order Number: 8150001    Warehouse Code: AAA    Prod ID: AB01497
Qty Stored: 100    Ref: Y    Prod Descr: PURCHASE ORDER    Units Stored:    Sens: N
Req No:    Qty/Pak:    PO No: 1150000    Pak/Ctn:
Ship U/I Qty: 100    Ship U/I: PK    Sell Price: $25.00    Bill U/I Qty: 100    Billing U/M: P    Frgt/Terms: PD
Function: Purchasing    Global: N    Max Rel: 100    Remarks:    Ind Code:
Pri/2nd Sort: S    Price List: 000    Ply: 4    Consec. No.: N    MWP: AAA    Size: 090102 × 110000
Cost Center:    Reorder Point:    Month Lead: 4    Est Month Usage: 300
Order is: C    Order Number: 8150002    Warehouse Code: AAA    Prod ID: HR0500
Qty Stored: 50    Ref: Y    Prod Descr: PERSONNEL CHANGE SHEET    Units Stored:    Sens: N
Req No:    Qty/Pak:    PO No: 1150000    Pak/Ctn:
Ship U/I Qty: 50    Ship U/I: PK    Sell Price: $22.30    Bill U/I Qty: 50    Billing U/M: P    Frgt/Terms: PD
Function: Personnel    Global: N    Max Rel: 100    Remarks:    Ind Code:
Pri/2nd Sort: S    Price List: 013    Ply: 1    Consec. No.: N    MWP:    Size: 090102 × 110000
Cost Center:    Reorder Point:    Month Lead: 4    Est Month Usage: 100
Order is: C    Order Number: 8150003    Warehouse Code: AAA    Prod ID: GN
Qty Stored: 100    Ref: Y    Prod Descr: GENERIC LETTERHEAD    Units Stored:    Sens: N
Req No:    Qty/Pak:    PO No: 1150000    Pak/Ctn:
Ship U/I Qty: 100    Ship U/I: PK    Sell Price: $25.00    Bill U/I Qty: 100    Billing U/M: P    Frgt/Terms: PD
Function: GENERAL    Global: N    Max Rel: 100    Remarks:    Ind Code:
Pri/2nd Sort: S    Price List: 600    Ply: 1    Consec. No.: N    MWP:    Size: 080102 × 110000
Cost Center:    Reorder Point:    Month Lead: 3    Est Month Usage: 920
Order is: C    Order Number: 5130003    Warehouse Code: AAA    Prod ID: MF100
Qty Stored: 250    Ref: N    Prod Descr: RETURN GOODS NOTICE    Units Stored:    Sens: N
Req No:    Qty/Pak:    PO No:    Pak/Ctn:
Ship U/I Qty: 250    Ship U/I: PK    Sell Price: $29.63    Bill U/I Qty: 250    Billing U/M: P    Frgt/Terms: PD
Function: Other    Global: N    Max Rel:    Remarks:    Ind Code:
Pri/2nd Sort: S    PriceList: 300    Ply: 4    Consec. No.: N    MWP:    Size: 090708 × 110000
Cost Center:    Reorder Point:    Month Lead: 3    Est Month Usage: 4,000

TABLE 3-continued

| | | | | |
|---|---|---|---|---|
| Order is: C | Order Number: 8150005 | Warehouse Code: AAA | Prod ID: ABC | |
| Qty Stored: 1,234,567 | Ref: Y | Prod Descr: NAME | Units Stored: | Sens: N |
| Req No: | Qty/Pak: | PO No: 1150000 | Pak/Ctn: | |
| Ship U/I Qty: 1,234,567 | Ship U/I: PK | Sell Price: $22.22 | Bill U/I Qty: 1,234,567 | Billing U/M: P    Frgt/Terms: PD |
| Function: GENERAL | Global: N | Max Rel: 100 | Remarks: | Ind Code: |
| Pri/2nd Sort: S | Price List: 000 | Ply: 1 | Consec. No.: N | MWP:    Size: 000000 × 000000 |
| Cost Center: | Reorder Point: | Month Lead: 4 | Est Month Usage: 500 | |
| Order is: C | Order Number: 8150009 | Warehouse Code: AAA | Prod ID: A02930 | |
| Qty Stored: 0 | Ref: | Prod Descr: SECOND ORDER FOR | Units Stored: 0 | Sens: N |
| Req No: | Qty/Pak: 0 | PO No: 1150000 | Pak/Ctn: 0 | |
| Ship U/I Qty: 0 | Ship U/I: | Sell Price: $25.00 | Bill U/I Qty: 0 | Billing U/M:    Frgt/Terms: |
| Function: | Global: | Max Rel: 0 | Remarks: | Ind Code: |
| Pri/2nd Sort: | Price List: 650 | Ply: 1 | Consec. No.: N | MWP: Size: 000000 × 000000 |
| Cost Center: | Reorder Point: 0 | Month Lead: 0 | Est Month Usage: 200 | |

A document management system is capable of processing the type of form data present in table 3 and producing an improved form portfolio from the processed form data. A variety of document management systems, including FORMPAC, PRISM, and FORMOS®, available from The Standard Register Company, Dayton, Ohio, are widely used and well known throughout the business forms industry. DMS input data is either produced by a DMS user observing a DMS input field report similar to that shown in FIG. 3 or produced by the CDA, sent to the I/O port 26, and input directly into a DMS via a digital data connection.

Figure 2:
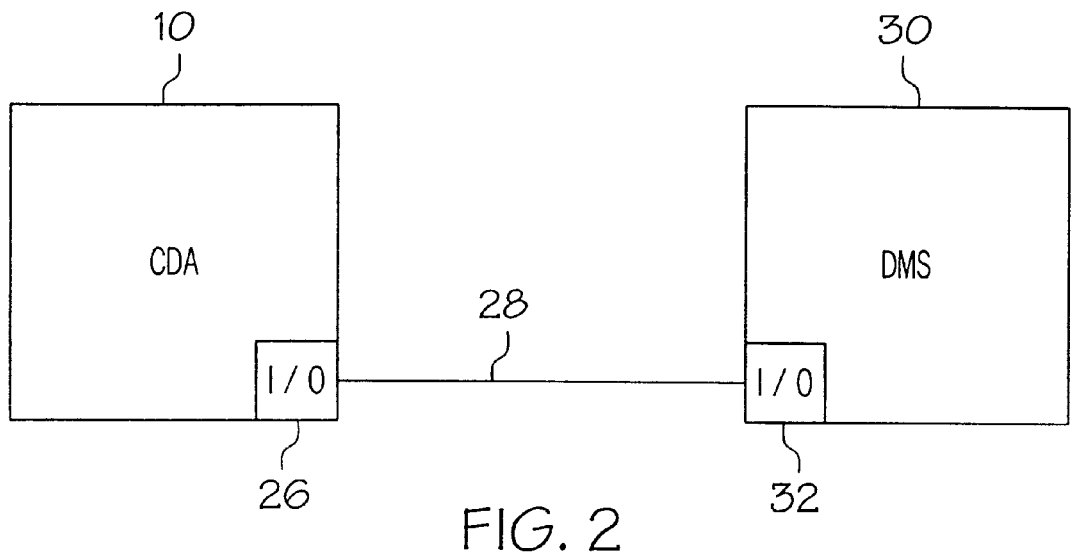
FIG. 2 is a block diagram of a comprehensive document audit system coupled to a document management system in accordance with the present invention.

The format shown in Table 3 is specifically designed for use with the FORMPAC document management system. A direct DMS digital data connection is illustrated in FIG. 2. As is illustrated in FIG. 2, where like elements are represented by like reference numbers, a document field report is exported as digital data to a document management system (DMS) 30 via I/O port 26, data connection 28, and I/O port 32. The DMS 30 contains operational software and equipment for designing and producing customized forms.

Figure 3:
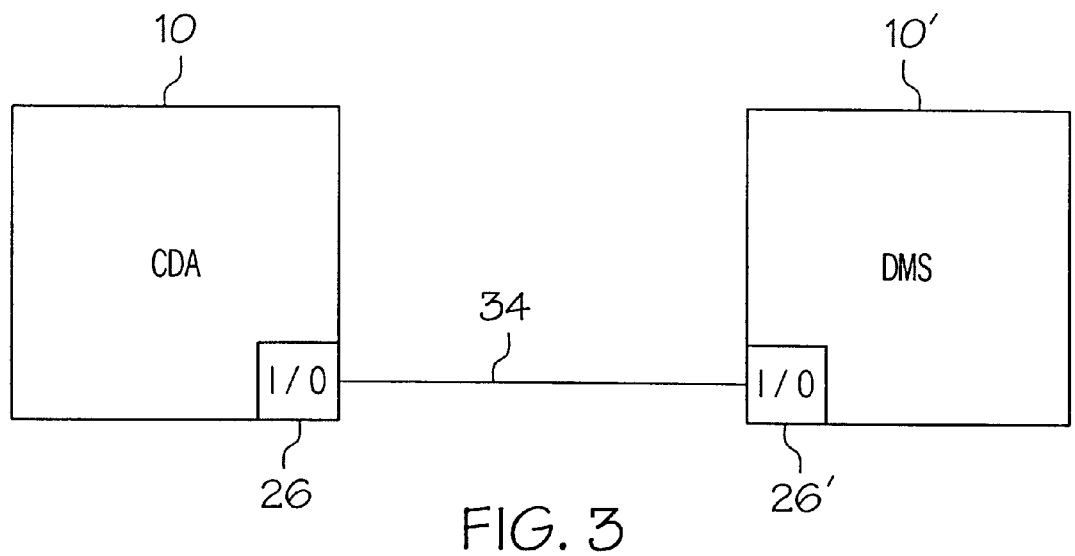
FIG. 3 is a block diagram of a comprehensive document audit system coupled to a companion comprehensive document audit system in accordance with the present invention.

According to yet another aspect of the present invention, sorted data corresponding to the selected data fields may be exported to or imported from a companion CDA 10' via I/O ports 26 and 26'. As is illustrated in FIG. 3, where like elements are represented by like reference numbers, sorted data is exported along data connection 34 to a companion CDA 10' equipped with an I/O port 26'. Alternatively, sorted data may be saved on a floppy disk or other data file storage device in the import/export file storage unit 20 and transferred among CDA systems through file copying. In this manner document data can be shared and consolidated among a plurality of document audit systems. It is contemplated by the present invention that data may also be exported to or imported from a database via I/O port 26.

Figure 4:
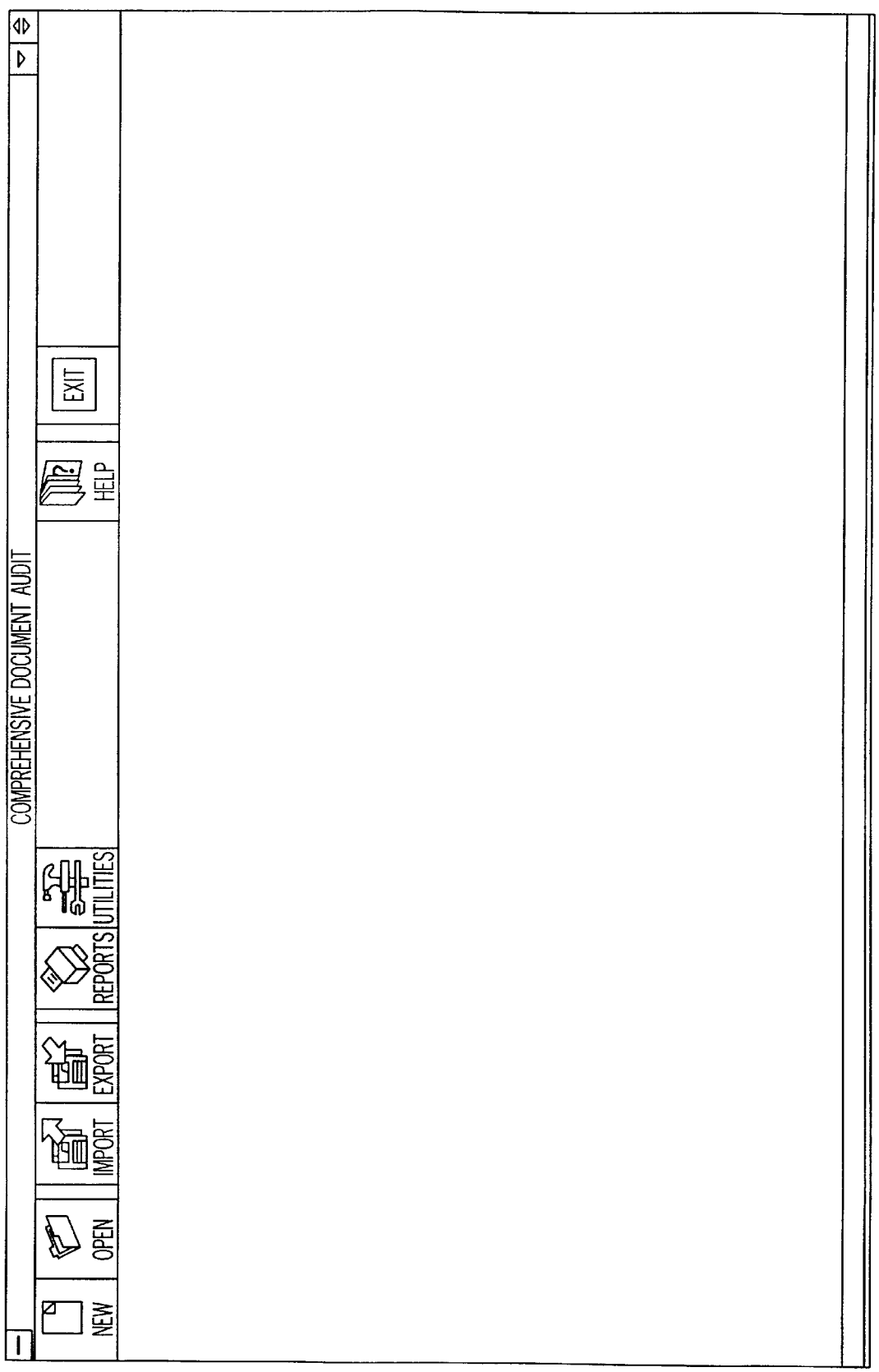
Figure 6:
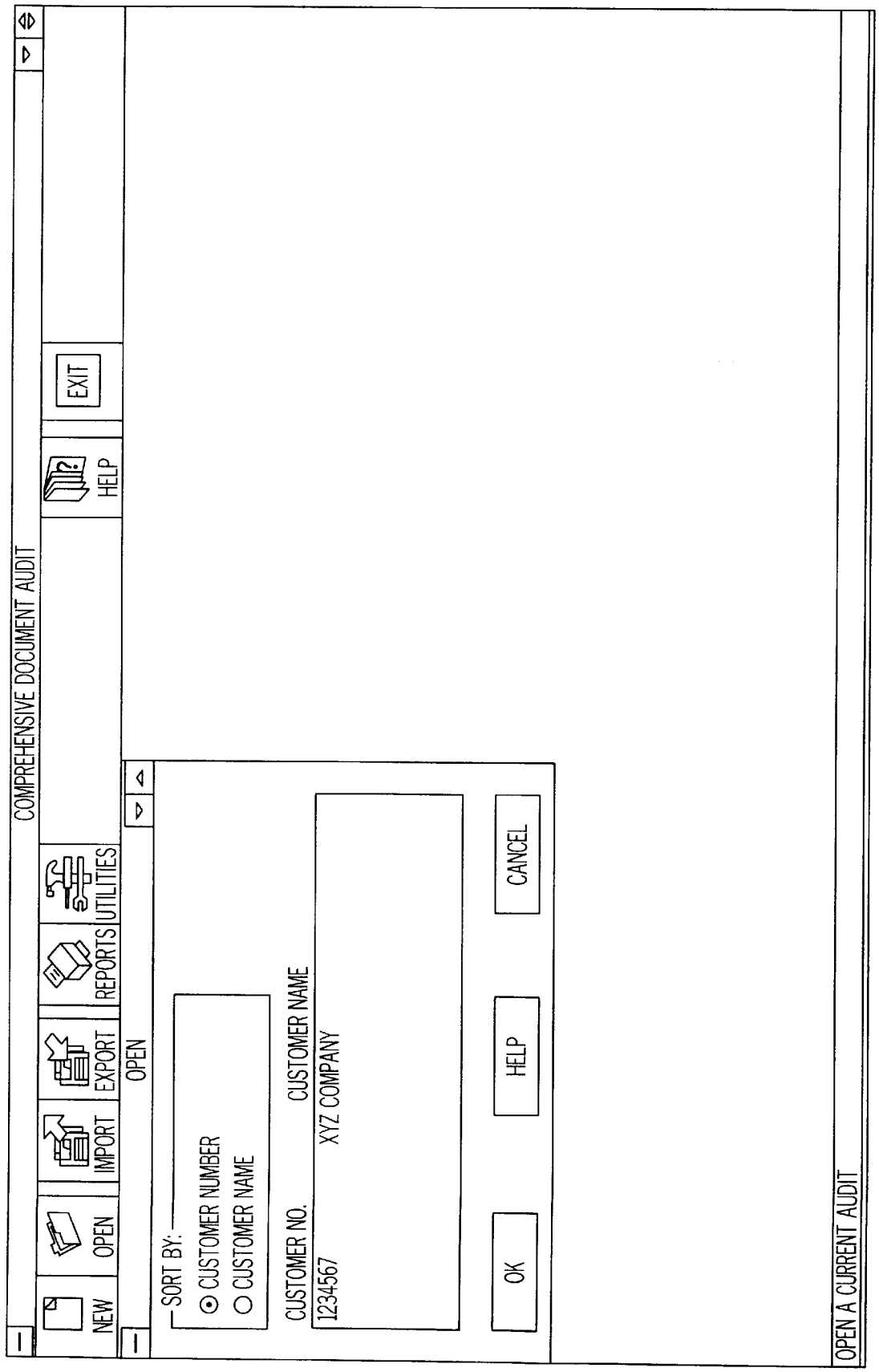
Figure 11:
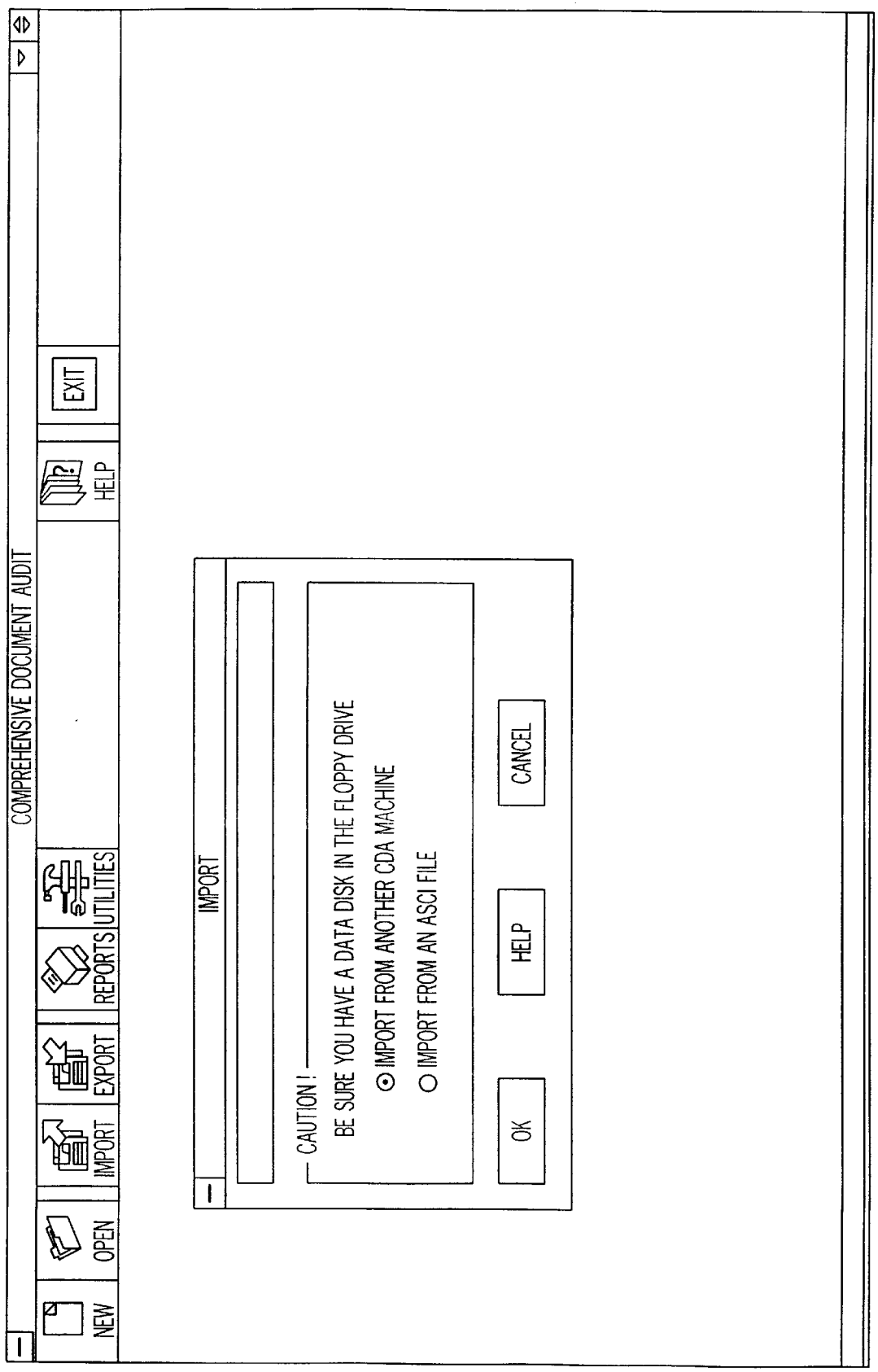
Figure 12:
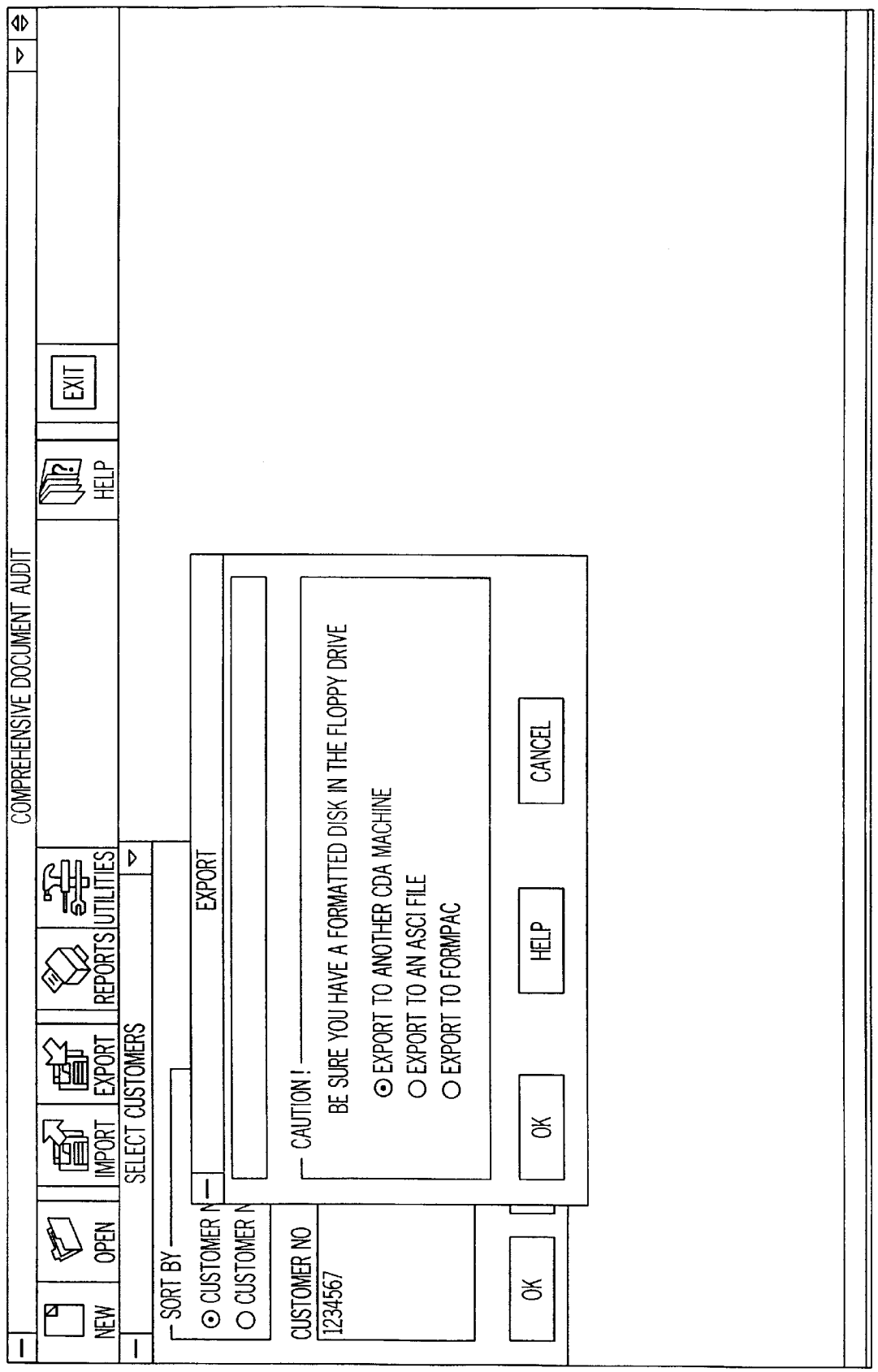
Figure 14:
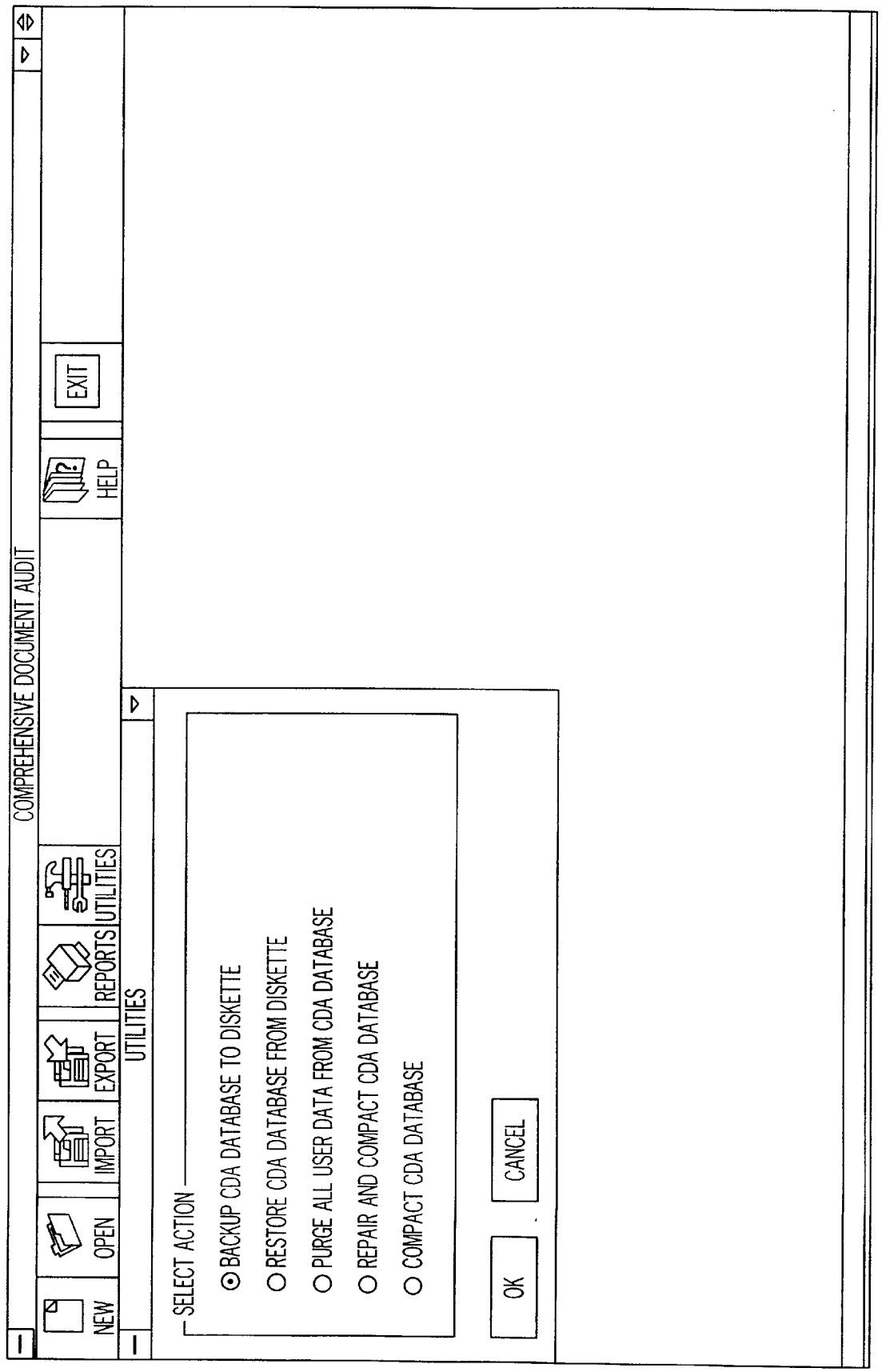
Figure 15:
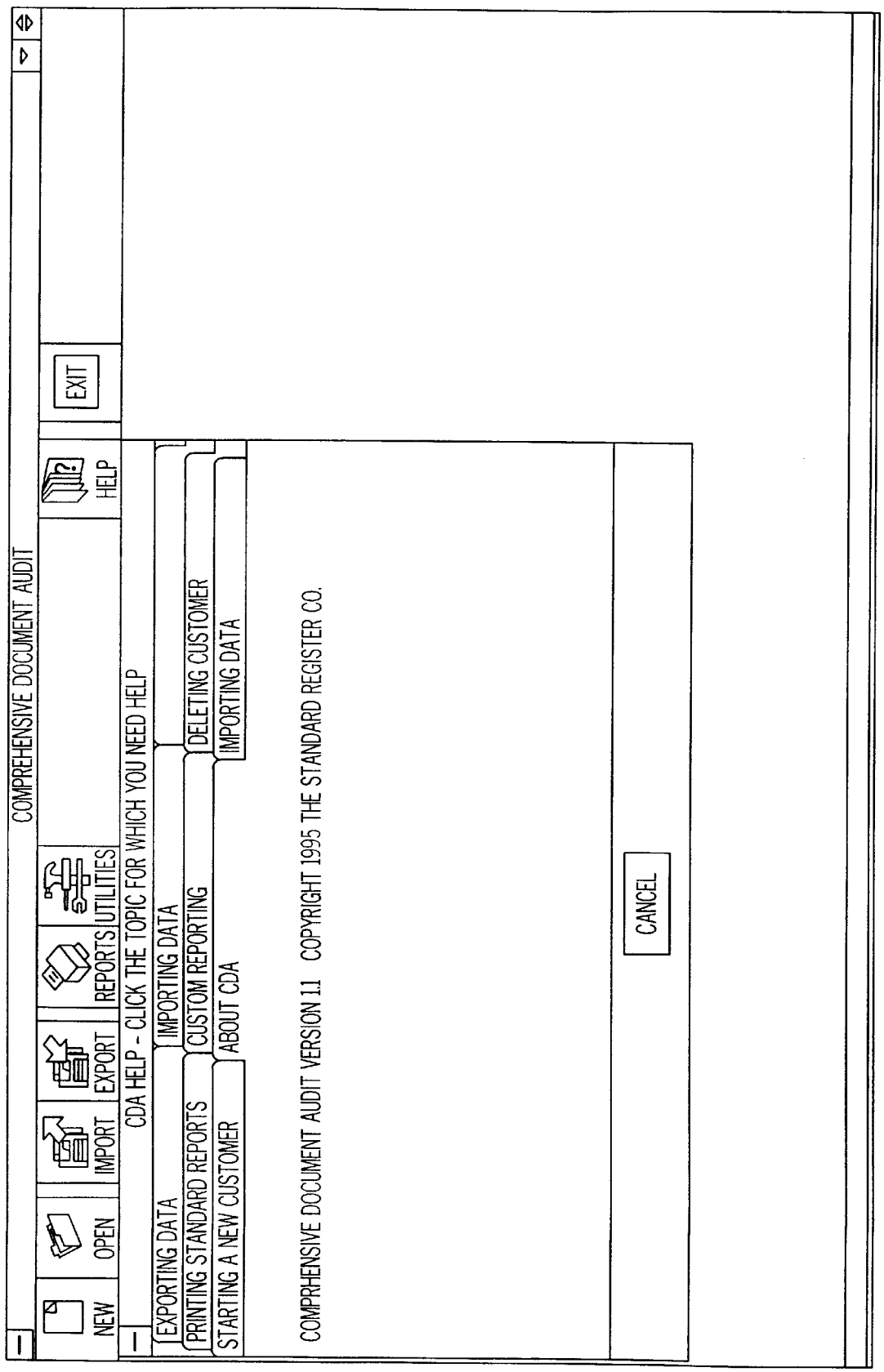

It is contemplated by the present invention that a variety of source codes may be utilized to enable the data handling and sorting described herein. Appendix A is an example of a preferred CDA data structure and source code according to the present invention. The preferred CDA uses two fundamental input and navigation elements: a mouse and a keyboard. The screen prints shown in FIGS. 4–15 represent the preferred user interface format for use with the data structure and source code presented in appendix A. FIG. 4 is the CDA system window screen print, FIG. 5 shows the customer audit data screen print, FIG. 6 shows the file open options screen print, FIG. 7 shows the Fast FormPac data field entry screen print, FIG. 8 shows the form search screen print, FIG. 9 shows the Full FormPac data field entry screen print, FIG. 10 shows the Form Features data field entry screen print, FIG. 11 shows the import options screen print, FIG. 12 shows the export options screen print, FIG. 13 shows the data field report selection screen print, FIG. 14 shows the utilities menu screen print, and FIG. 15 shows the help menu screen print.

Having described the invention in detail and by reference to preferred embodiments thereof, it will be apparent that modifications and variations are possible without departing from the scope of the invention defined in the appended claims.

What is claimed is:

1. A comprehensive document audit system comprising:
a digital controller;
a document data entry device in communication with said digital controller; and
a document field report generator in communication with said digital controller wherein said digital controller is programmed to
  cause characteristic document data indicative of the characteristics of a plurality of selected documents to be received,
  sort said characteristic document data according to a plurality of preselected data fields, wherein said plurality of preselected data fields include data fields comprised of identified document characteristic information and assigned document characteristic information, wherein said identified document characteristic information comprises document information present on said selected documents, and wherein said assigned document characteristic information comprises document characteristic information assigned to said selected documents,
  cause sorted document data to be saved, and
  enable said document field report generator to generate a field report, wherein said field report shows
    a number of said plurality of preselected data fields including data fields comprised of identified document characteristic information and assigned document characteristic information and
    specific ones of said plurality of selected documents having characteristic document data corresponding to the set of said preselected data fields.

2. A system as claimed in claim 1, further comprising a sorted data memory in communication with said digital controller.

3. A system as claimed in claim 1, wherein said data entry device comprises a computer terminal.

4. A system as claimed in claim 1, wherein said report generator comprises a printer.

5. A system as claimed in claim 1, wherein said report generator comprises a computer display screen.

6. A system as claimed in claim 1, wherein said report generator comprises a data output port coupled to a document management system.

7. A system as claimed in claim 1, wherein said report generator includes a report content selector coupled to said digital controller.

8. A system as claimed in claim 1, wherein said digital controller is programmed to enable said document field report generator to generate a field report displaying sorted data corresponding to a plurality of said preselected data fields.

9. A system as claimed in claim 1, wherein said digital controller is programmed to enable said document field report generator to generate a field report displaying sorted data corresponding to a plurality of said preselected data fields and to sort each report by any field contained on that report.

10. A system as claimed in claim 1, wherein said report generator includes a report content selector coupled to said digital controller and wherein said digital controller is programmed to cause the report generator to generate a custom field-selected report.

11. A system as claimed in claim 1, wherein said document data includes document identification information.

12. A system as claimed in claim 1, wherein said document data includes document storage information.

13. A system as claimed in claim 1, wherein said document data includes document distribution information.

14. A system as claimed in claim 1, wherein said document data includes document usage information.

15. A system as claimed in claim 1, wherein said document data includes a form function code.

16. A system as claimed in claim 1, wherein said document data includes at least one form improvement code.

17. A system as claimed in claim 16, wherein said at least one improvement code includes a value added rating code.

18. A system as claimed in claim 16, wherein said at least one improvement code includes a time savings code.

19. A system as claimed in claim 16, wherein said at least one improvement code includes a textual improvement code.

20. A system as claimed in claim 1, wherein said document data includes information pertinent to future data input into a document management system.

21. A system as claimed in claim 1, wherein said digital controller is further programmed to cause said sorted document data to be imported from or exported to a companion comprehensive document audit system.

22. A system as claimed in claim 1, wherein said digital controller is further programmed to cause said sorted document data to be imported from or exported to a data file.

23. A system as claimed in claim 1, wherein said digital controller is further programmed to cause sorted document data to be exported to a document management system.

24. A system as claimed in claim 1 wherein said document physical construction information comprises data indicative of at least one of the following: (i) the length and width of the document at issue, (ii) the number of plies included in the document of issue, (iii) the presence or absence of a carbon ply in the document at issue, (iv) the presence of backprinting in the document at issue, (v) the presence of perforations in the document at issue, (vi) the presence of file holes in the document at issue, (vii) the number of ink colors or paper colors utilized in the document at issue, and (viii) the weight of the paper utilized in the document at issue.

25. A process for generating a document field report, comprising the steps of:
assigning document characteristic information to respective documents within a group of documents;
identifying document characteristic information from respective documents within said group of documents;
identifying a set of characteristic document data indicative of the characteristics of each document within said group of documents, wherein said characteristic document data includes assigned document characteristic information and identified document characteristic information; inputting said characteristic document data into a computer programmed to
sort said characteristic document data according to a plurality of preselected data fields, wherein said plurality of preselected data fields include data fields comprised of said identified document characteristic information and said assigned document characteristic information,
cause sorted characteristic document data to be saved, and enable generation of a field report, wherein said field report shows
a number of said preselected data fields including said identified document characteristic information and said assigned document characteristic information and
specific ones of said group of documents having characteristic document data corresponding to the preselected data fields; and
generating said field report.

26. A process as claimed in claim 25, wherein said assigning step includes the step of assigning a department code to each document within said group of documents.

27. A process as claimed in claim 25, wherein said assigning step includes the step of assigning a function code to each document within said group of documents.

28. A process as claimed in claim 25, wherein said assigning step includes the step of assigning at least one improvement code to each document within said group of documents.

29. A process as claimed in claim 25, wherein said assigning step includes assigning a value added rating to each document within said group of documents.

30. A process as claimed in claim 25, wherein said assigning step includes assigning a time savings code to each document within said group of documents.

31. A process as claimed in claim 25, wherein said identifying step includes recording said document data in a predetermined format.

32. A process as claimed in claim 25, wherein said inputting step comprises entering said document data at a computer terminal.

33. A process as claimed in claim 25, wherein said sorting step comprises identifying a document from which the characteristic document data originated and separating the characteristic document data for each document into a plurality of data fields.

34. A process as claimed in claim 33, wherein a display screen user interface format is used to accomplish said identifying and separating steps.

35. A process as claimed in claim 25, wherein said generating step comprises generating said field report as a display on a computer display screen.

36. A process as claimed in claim 25, wherein said generating step comprises generating said field report as a computer print-out.

37. A process claimed in claim 25, wherein said generating step comprises generating said field report as a data input to a document management system.

38. A process as claimed in claim 25, wherein said field report indicates duplicate documents.

39. A process as claimed in claim 25 wherein said document physical construction information comprises data indicative of at least one of the following: (i) the length and width of the document at issue, (ii) the number of plies included in the document of issue, (iii) the presence or absence of a carbon ply in the document at issue, (iv) the presence of backprinting in the document at issue, (v) the presence of perforations in the document at issue, (vi) the presence of file holes in the document at issue, (vii) the number of ink colors or paper colors utilized in the document at issue, and (viii) the weight of the paper utilized in the document at issue.

* * * * *

UNITED STATES PATENT AND TRADEMARK OFFICE
CERTIFICATE OF CORRECTION

PATENT NO : 5,953,702
DATED : September 14, 1999
INVENTOR(S): Ohlemacher et al

It is certified that error appears in the above-identified patent and that said Letters Patent is hereby corrected as shown below:

Col. 10, line 26:

Claim1 reads as:

"1. A comprehensive document audit system comprising:
    a digital controller;
    a document data entry device in communication with said digital controller; and
    a document field report generator in communication with said digital controller wherein said digital is programmed to
        cause characteristic document data indicative of the characteristics of a plurality
        of selected documents to be received,
            sort said characteristic document data according to a plurality of preselected data
        fields, wherein said plurality of preselected data fields include data fields comprised of identified document characteristic information and assigned document characteristic information, wherein said identified document information present on said selected documents, and wherein said assigned document characteristic information comprises document characteristic information assigned to said selected documents,
        cause sorted document data to be saved, and
        enable said document field report generator to generate a field report, wherein said
    field report shows
            a number of said plurality of preselected data fields including data fields
        comprised of identified document characteristic information and assigned document
        information and
            spectific ones of said plurality of selected documents having characteristic
        document data corresponding to the set of said preselected data fields."

and should read as:

--1. A comprehensive document audit system comprising:
    a digital controller;
    a document data entry device in communication with said digital controller; and
    a document field report generator in communication with said digital controller wherein said digital controller is programmed to

UNITED STATES PATENT AND TRADEMARK OFFICE
CERTIFICATE OF CORRECTION

PATENT NO : 5,953,702
DATED : September 14, 1999
INVENTOR(S): Ohlemacher et al

It is certified that error appears in the above-identified patent and that said Letters Patent is hereby corrected as shown below:

cause characteristic document data indicative of the characteristics of a plurality of selected documents to be received, wherein said characteristic document data includes data that represents the physical construction of the document,
sort said characteristic document data according to a plurality of preselected data fields, wherein said plurality of preselected data fields include data fields comprised of identified document characteristic information and assigned document physical construction information, wherein said identified document characteristic information comprises document information present on said selected documents, and wherein said assigned document physical construction information comprises data that represents the physical construction of the document,
cause sorted document data to be saved, and
enable said document field report generator to generate a field report, wherein said field report shows
a number of said plurality of preselected data fields including data fields comprised of identified document characteristic information and assigned document physical construction information and
specific ones of said plurality of selected documents having characteristic document data corresponding to the set of said preselected data fields.--

Col. 11, line 62:

Claim 25 should read --

"25. A process for generating a document field report, comprising the steps of:
assigning document characteristic information to respective documents within a group of documents;
identifying document characteristic information from respective documents within said group of documents;
identifying a set of characteristic document data indicative of the characteristics of each document within said group of documents, wherein said characteristic document data includes assigned document characteristic information and identified document characteristic information; inputting said characteristic document data into a computer programmed to

UNITED STATES PATENT AND TRADEMARK OFFICE
CERTIFICATE OF CORRECTION

PATENT NO : 5,953,702
DATED : September 14, 1999
INVENTOR(S): Ohlemacher et al

Page 3 of 3

It is certified that error appears in the above-identified patent and that said Letters Patent is hereby corrected as shown below:

sort said characteristic document data according to a plurality of preselected data fields, wherein said plurality of preselected data fields include data fields comprised of said identified document characteristic information and said assigned document physical construction information, wherein said assigned document physical construction information comprises data that represents the physical construction of the document,
cause sorted characteristic document data to be saved, and
enable generation of a field report, wherein said field report shows
a number of said preselected data fields including said identified document characteristic information and said assigned document physical construction information and
specific ones of said group of documents having characteristic document data corresponding to the preselected data fields; and
generating said field report.--

Signed and Sealed this

Twenty-second Day of August, 2000

Attest:

Q. TODD DICKINSON

*Attesting Officer*   *Director of Patents and Trademarks*